(12) United States Patent
Ross

(10) Patent No.: US 8,209,071 B2
(45) Date of Patent: Jun. 26, 2012

(54) METHODS AND APPARATUS FOR AIRCRAFT TURBULENCE DETECTION

(75) Inventor: Anthony Ross, Plano, TX (US)

(73) Assignee: Raytheon Company, Waltham, MA (US)

( * ) Notice: Subject to any disclaimer, the term of this patent is extended or adjusted under 35 U.S.C. 154(b) by 794 days.

(21) Appl. No.: 11/735,597

(22) Filed: Apr. 16, 2007

(65) Prior Publication Data

US 2008/0255714 A1   Oct. 16, 2008

(51) Int. Cl.
*G06F 7/70* (2006.01)
*G01C 21/00* (2006.01)

(52) U.S. Cl. ............... 701/14; 701/10; 701/3; 701/213

(58) Field of Classification Search .................. None
See application file for complete search history.

(56) References Cited

U.S. PATENT DOCUMENTS

| | | | | |
|---|---|---|---|---|
| 4,521,857 A * | 6/1985 | Reynolds, III | ............. | 379/88.17 |
| 4,642,775 A | 2/1987 | Cline et al. | | |
| 4,706,902 A * | 11/1987 | Destuynder et al. | ........ | 244/76 C |
| 5,265,024 A * | 11/1993 | Crabill et al. | ................. | 701/200 |
| 5,657,009 A * | 8/1997 | Gordon | ........................ | 340/968 |
| 6,014,606 A * | 1/2000 | Tu | ................................. | 701/200 |
| 6,700,482 B2 | 3/2004 | Ververs et al. | | |
| 7,161,525 B1 * | 1/2007 | Finley et al. | ................. | 342/26 R |
| 7,523,657 B2 * | 4/2009 | Bommier et al. | .......... | 73/170.02 |
| 2003/0205644 A1 * | 11/2003 | Najmabadi et al. | ............ | 244/195 |
| 2004/0174542 A1 * | 9/2004 | Handman et al. | ............. | 356/622 |
| 2007/0096979 A1 * | 5/2007 | Hinnant et al. | .......... | 342/357.06 |
| 2007/0162197 A1 * | 7/2007 | Fleming | .......................... | 701/10 |
| 2008/0043234 A1 * | 2/2008 | Mirand et al. | ................ | 356/342 |
| 2009/0157239 A1 * | 6/2009 | Walton et al. | ..................... | 701/6 |

FOREIGN PATENT DOCUMENTS

| | | |
|---|---|---|
| EP | 1 375 343 A1 | 1/2004 |
| WO | WO 99/40457 | 8/1999 |
| WO | WO 02/36427 A2 | 5/2002 |
| WO | WO 02/36427 A3 | 5/2002 |

OTHER PUBLICATIONS

Notification Concerning Transmittal of International Preliminary Report on Patentability (Chapter 1 of the Patent Cooperation Treaty, PCT/US2008/059330, dated Oct. 29, 2009, 2 pages.
Written Opinion of the International Searching Authority, PCT/US2008/059330, dated Oct. 29, 2009, 6 pages.
Notification of transmittal of the International Search Report dated Jul. 16, 2008, PCT/US2008/059330.
The International Search Report dated Jul. 16, 2008, PCT/US2008/059330.
Written Opinion of the International Searching Authority, or the Declaration dated Jul. 16, 2008, PCT/US2008/059330.
Office Action from the European Patent Office dated Feb. 18, 2011 for EP Application No. 08745058.1, 4 pages.

* cited by examiner

*Primary Examiner* — Khoi Tran
*Assistant Examiner* — Ian Jen
(74) *Attorney, Agent, or Firm* — Daly, Crowley, Mofford & Durkee, LLP

(57) ABSTRACT

Methods and apparatus for an in-flight air turbulence detection system. In one embodiment, a system includes an air turbulence detector and a transmitter to transmit turbulence information. In another embodiment, a system includes a receiver, a detection processing module, an aircraft ID module, and a route modification module.

11 Claims, 5 Drawing Sheets

METHODS AND APPARATUS FOR AIRCRAFT TURBULENCE DETECTION

BACKGROUND

As is known in the art, air turbulence can cause an aircraft to shudder dramatically in flight and experience an instantaneous drop in altitude. In such an environment, passengers and the flight crew, who are not buckled into their seats by a safety belt, can be injured by an impact to the ceiling or other cabin structures. Injuries can also be sustained during turbulence by loose items flying around in the cabin, such as food carts, carry on luggage, laptops, cell phones, beverage cans, etc. In view of this, aircraft flight plans and en route modifications attempt to avoid areas of known turbulence.

Areas of potential turbulence may be identified by weather patterns known to cause turbulence. Such weather patterns can be located using weather radars for example. Further, when pilots encounter significant in-flight turbulence they generally report these incidents to air traffic control and/or other aircraft so that this area of turbulence can be avoided. Air traffic controllers can contact aircraft en route and generate flight plans to avoid identified areas. However, such a method is less than precise. In addition, the level of turbulence reported by a pilot is somewhat subjective. That is, for a particular level of turbulence some pilots may report the turbulence while others may not.

SUMMARY

The present invention provides methods and apparatus for detection of in-flight air turbulence. Areas of turbulence can be reported by an aircraft to an air traffic control station, so that other aircraft can be made aware of the turbulent areas and flight plan modifications can be made. With this arrangement, the air travel experience and safety of the flight can be improved. While the invention is primary shown and described in conjunction with commercial aircraft, it is understood that the invention is applicable to aircraft in general, for which it is desirable to be made aware and/or avoid known areas of air turbulence.

In one aspect of the invention, a system comprises an air turbulence detector to detect in-flight turbulence for an airborne aircraft, and a transmitter to transmit information on the detected turbulence to an air traffic control location.

The system can further include one or more of the following features: the air turbulence detector includes a laser and a detection grid configured to be affixed to an aircraft wing to measure wing deflection due to the turbulence, the air turbulence detector includes an accelerometer, the transmitter is configured to transmit the detected turbulence information via a satellite, a turbulence processing module to derive characteristics of the detected turbulence, the turbulence processing module includes one or more criteria to determine whether a turbulence alert should be generated.

In another aspect of the invention, a system comprises a receiver to receive air turbulence information from aircraft, the air turbulence information including a location, a detection processing module coupled to the receiver to process the air turbulence information, an aircraft ID module to identify aircraft having a flight plan intersecting with the location of the air turbulence, and a route modification module to evaluate modifications to the flight plans for the identified aircraft.

The system can further include one or more of: the system forms a part of an air traffic control station, the route modification module automatically modifies flight plans, the route modification module generates proposed modifications to the flight plans for approval by a pilot of the aircraft, the route modification module includes criteria to evaluate flight plan modifications including weather information, storm locations, air traffic, collision avoidance, arrival time impact, and fuel supply, weighting factors for the criteria.

In a further aspect of the invention, a system comprises a turbulence reporting system including an interface module to communicate with satellites, aircraft, and/or an air traffic control station, a control module coupled to the interface module, and a database to store received turbulence information.

The system can further include features where the system provides stored turbulence information in response to a request regarding a selected area, provided turbulence information includes location and magnitude, and the stored turbulence information includes the 48 contiguous states of the United States.

In another aspect of the invention, a method comprises receiving air turbulence information from a turbulence detector on a first aircraft, processing the received air turbulence information, and modifying a flight plan for a second aircraft based upon the processed air turbulence information.

The method can further include automatically modifying the flight plan for the second aircraft automatically based upon selected criteria, and providing the modified flight plan for transmission to a pilot of the second aircraft for approval.

BRIEF DESCRIPTION OF THE DRAWINGS

The foregoing features of this invention, as well as the invention itself, may be more fully understood from the following description of the drawings in which.

DETAILED DESCRIPTION

Figure 1:
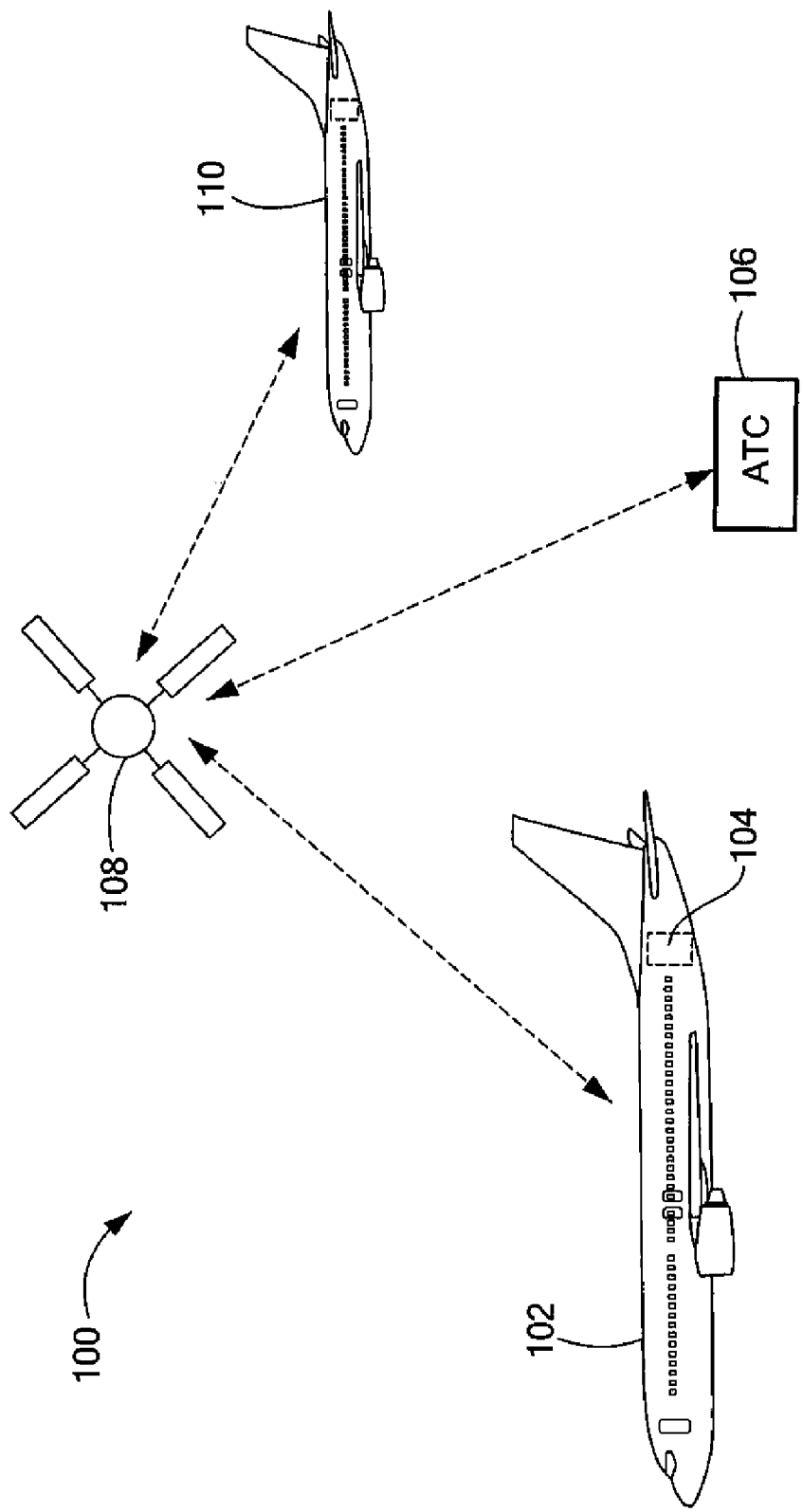
FIG. 1 is a schematic depiction of an air turbulence system in accordance with exemplary embodiments of the invention.

FIG. 1 shows an air turbulence system 100 in accordance with exemplary embodiments of the invention. An aircraft 102 includes a turbulence detector 104 to detect in-flight air turbulence and communicate this information to a remote air traffic control site 106, such as via satellite 108. The air traffic control site 106 can then contact, such as via the satellite 108, other aircraft 110 having flight plans intersecting the identified area of turbulence. With this arrangement, once turbulence is detected in a particular location other aircraft can be contacted to avoid this area. The turbulence information can include severity, location, e.g., latitude, longitude, and altitude, time stamp, duration, time since last detection, and the like.

Figure 2:
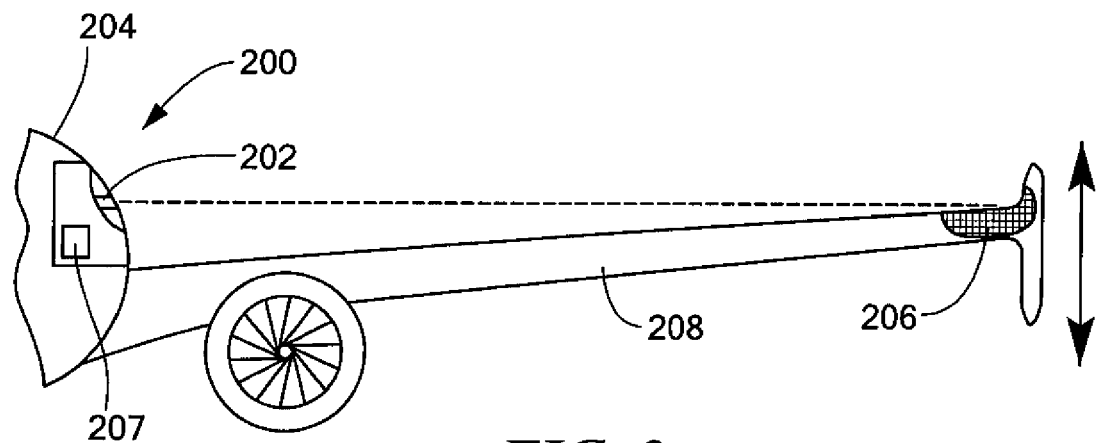
FIG. 2 is a pictorial representation of a turbulence detector in accordance with exemplary embodiments of the invention.

FIG. 2 shows an exemplary onboard turbulence detector 200 in accordance with exemplary embodiments of the invention. The detector 200 includes a laser 202 secured to an aircraft fuselage 204 so that the laser points at a detection grid 206 mounted on a wingtip 208 of the aircraft. A control module 207 is coupled to the laser 202 and the detection grid 206 to control overall operation of the detector 202 and process information from the laser/grid. A sensor 209 can detect energy reflected from the detection grid 206. Alternatively, the sensor 209 can form a part of the detection grid to detect energy emitted by the laser 102.

With no turbulence, the laser 202 points at a known location on the grid 206. When the aircraft is in flight and experiencing turbulence, the wing tip 208 will flex up and down with respect to the fuselage 204. The amount of wing flexure corresponds to the vertical displacement of the laser 202 signal along the detection grid 206. The greater the displacement of the wing tip position, with respect to the fuselage 204, the greater the magnitude of the turbulence. In addition, wingtip 208 acceleration can also be measured to determine further turbulence characteristics.

In general, the laser 202 and detection grid 206 are positioned and sized based upon the characteristics of a particular aircraft. For example, each aircraft has wings of a given size and rigidity. For example, an aircraft wing has a known length from fuselage to wingtip and a known deflection response. This information is used to generate a correlation between turbulence magnitude and wing deflection response.

In one embodiment, the laser detection grid 206 ranges from −30 to +30 degrees off horizontal (no turbulence) where turbulence is measured as a function of the number of "+/−" degrees of wingtip travel over time and altitude changes. For example, if the laser detection grid 206 senses that the aligned laser is showing a −20 to +20 degree of wingtip flex/flap, five times over a period of a second, accompanied by a non-trivial drop in altitude, this may suggest a mild to moderately severe amount of turbulence being experienced by the aircraft.

The parameters used to determine the amount of turbulence can be selected and adjusted to meet the needs of a particular application. For example, larger aircraft will generally have larger wings that have more deflection at the wing tips than smaller wings. In addition, aircraft velocity and acceleration, as well as size and heading, will have an impact on altitude changes when encountering turbulence.

It will be readily appreciated that a wide range of information can be collected and processed to define the detected turbulence. For example, turbulence can be detected as a single relatively violent and isolated event. Turbulence can also be detected as a series of moderate events that can be summed over a period of time for comparison against a given threshold. If the threshold is exceeded, then the system can transmit information that the area should be avoided unless a course alteration would be too costly in time, fuel, etc.

Figure 3:
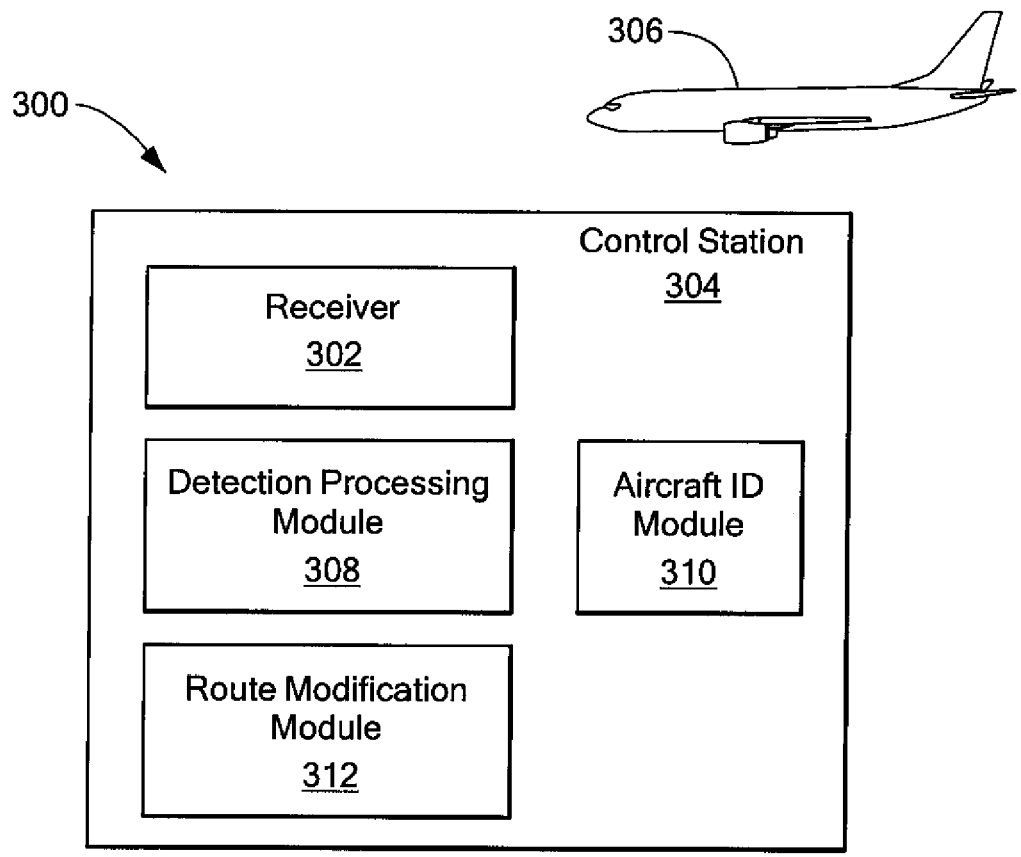
FIG. 3 is a block diagram of a turbulence control station in accordance with exemplary embodiments of the invention.

FIG. 3 shows system 300 for distributing air turbulence information in accordance with exemplary embodiments of the invention. A receiver 302 at an aircraft control station 304 receives turbulence information from an aircraft 306. A detection processing module 308 processes the turbulence information, such as evaluating the magnitude of the turbulence, and a an aircraft ID module 310 identifies those aircraft that are en route or have flight plans taking the aircraft through or near the reported area of turbulence. A route modification module 312 evaluates alternative routes for the identified aircraft and determines whether route modifications should be made.

In an exemplary embodiment, the system 300 automatically makes changes to flight plans. A pilot can be informed of the changes with an option to override the changes. Alternatively, proposed flight plan changes are provided to the pilot for acceptance or rejection.

The route modification module 312 uses a variety of factors and weighting schemes to determine whether route modifications should by made, or whether any alternate routes are available. Exemplary factors include weather information, e.g., storm locations, air traffic and collision avoidance, arrival time impact, fuel supply, and the like.

Figure 3A:
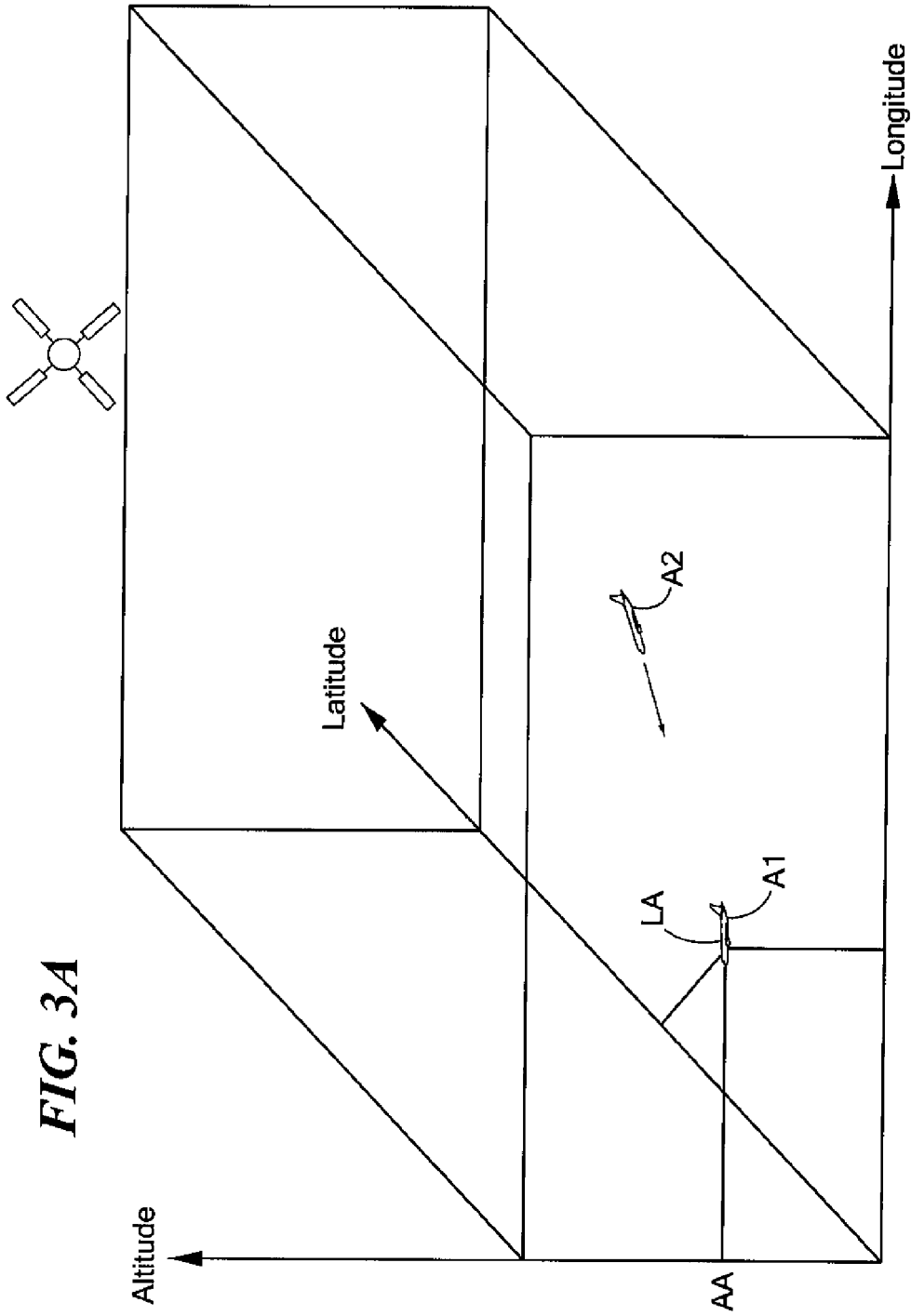
FIG. 3A is a graphical representation of flights and an area of turbulence that can be avoided in accordance with exemplary embodiments of the invention.

In one scenario shown in FIG. 3A in conjunction with FIG. 3A, a turbulence detector onboard a first aircraft A1 encounters moderate turbulence at location LA and altitude AA that is reported to air traffic control. This information is processed by the aircraft ID module 310, which identifies a second aircraft A2 that will pass through location LA.

The route modification module 312 determines whether the route for the second aircraft A2 should be modified to avoid the turbulence. In one scenario, it is determined that by altering the altitude of the second aircraft A2 the turbulence can be avoided. In another scenario, the route modification module 312 factors in the location of violent weather patterns tracking toward the area of turbulence that should be avoided so that no route changes are made. In a further scenario, on time arrival is heavily weighted so that only moderate turbulence does not result in route changes. Alternatively, the pilot of the second aircraft A2 is informed of the turbulence and possible route changes.

Figure 4:
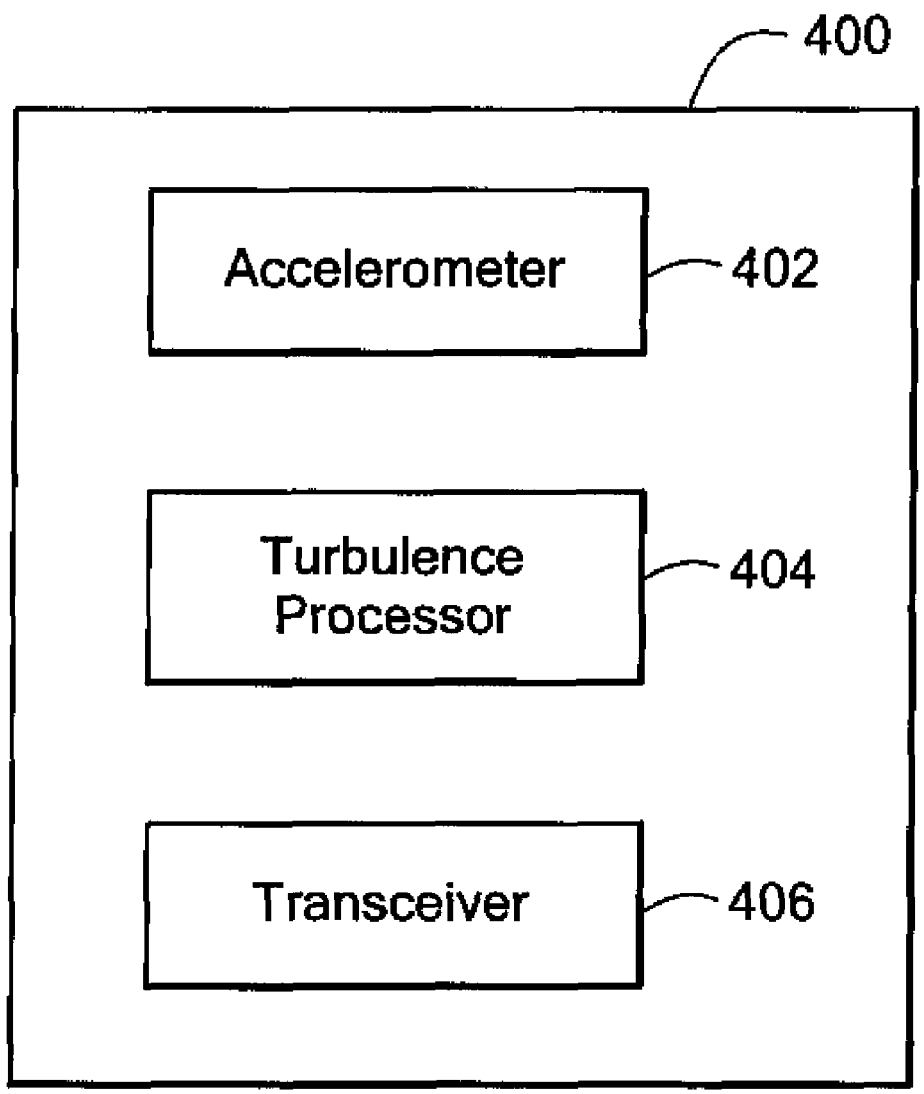
FIG. 4 is a block diagram of a turbulence detector in accordance with exemplary embodiments of the invention.

It is understood that the turbulence detector can be provided using a variety of mechanisms. FIG. 4 shows another embodiment of an in-flight turbulence detector 400 having an accelerometer 402 to detect turbulence. The detector 400 can be placed in the cabin or storage area of an aircraft, for example. The accelerometer 402 detects upward/downward acceleration of the aircraft during turbulence. The accelerometer 402 can provide turbulence information to a processing module 404 to process the data. For example, if the acceleration is greater than a predetermined threshold an alert can be generated for transmission by a transceiver module 406 to an air traffic control station.

In an alternative embodiment, an inertial sensor can be provided to detect aircraft movement due to in-flight turbulence. In a further embodiment, a spring-based element can be used determine when the magnitude of encountered turbulence is greater than a given threshold. For an example, a weight can be attached to a spring such that contact with a conductor is made by the weight when the turbulence causes the weight to overcome the force of the spring.

Figure 5:
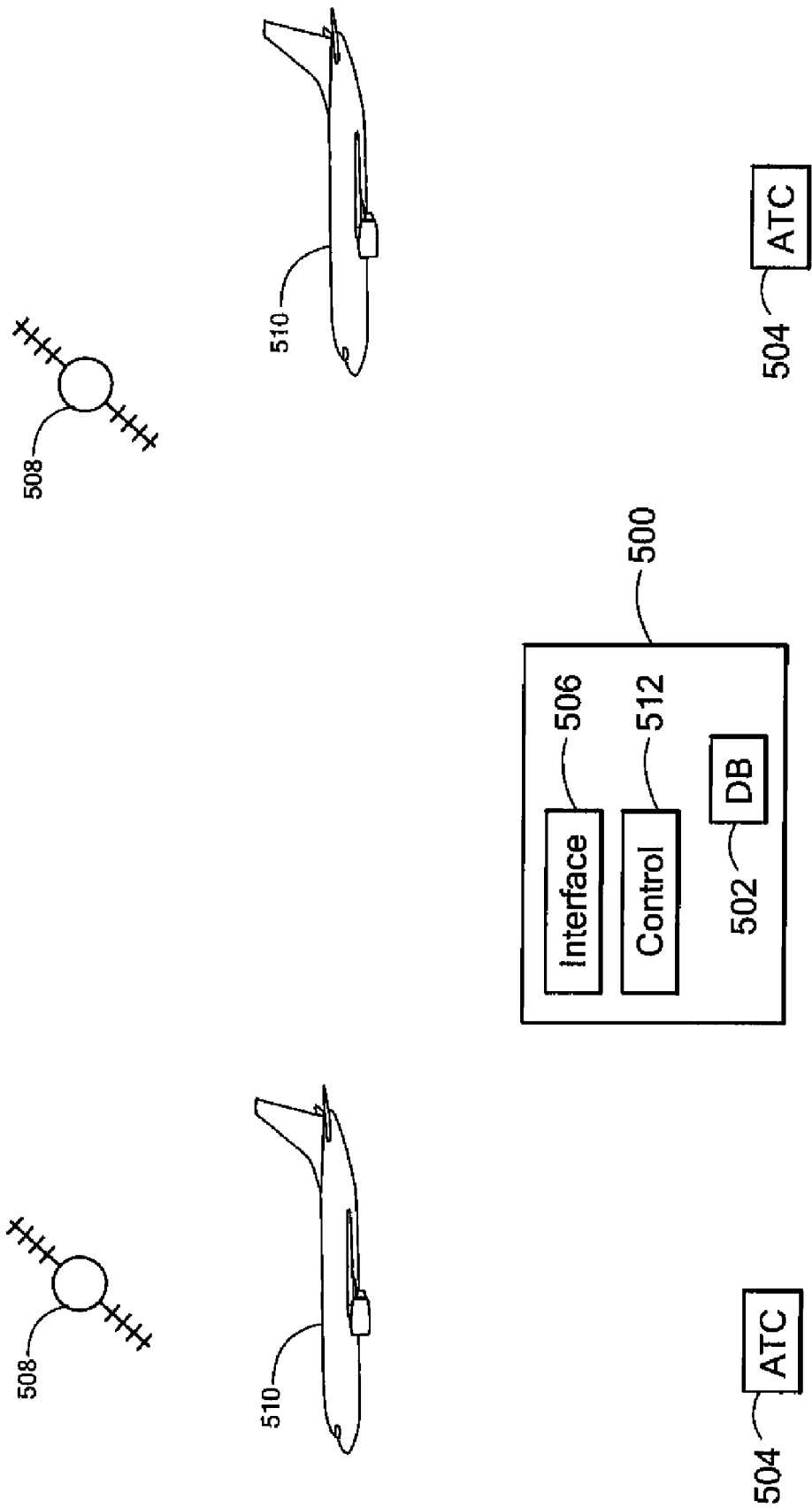
FIG. 5 is a schematic depiction of an air turbulence reporting system in accordance with exemplary embodiments of the invention.

In another aspect of the invention shown in FIG. 5, a turbulence reporting system 500 includes a central database 502 to receive, store and receive turbulence information from/to various air traffic control sites 504. The system 500 can include an interface module 506 to communicate with satellites 508, aircraft 510, and the like, as instructed by an overall control module 512. With this arrangement, areas of turbulence are tracked for a given area, such as the contiguous 48 states, or North America. Each air traffic control location 504 can generate flight plans that take into account areas of turbulence provided upon request by the turbulence reporting system.

Exemplary embodiments of the present invention provide real-time flight plan route updates/warnings to airborne aircraft for turbulence areas, eliminate the need for manual reporting of turbulence by a pilot to air traffic control, and enhance pre-flight planning. Areas of turbulence can be identified and considered, and a determination can be made whether or not it is appropriate to alter a flight plan based upon various criteria.

Having described exemplary embodiments of the invention, it will now become apparent to one of ordinary skill in the art that other embodiments incorporating their concepts may also be used. The embodiments contained herein should not be limited to embodiments disclosure herein, but rather

What is claimed is:

1. A system, comprising:
an air turbulence detector to detect in-flight turbulence for an airborne aircraft, the air turbulence detector comprising a laser and a detection grid, configured to be affixed to an aircraft wing to measure wing deflection due to the turbulence, wherein the laser illuminating different portions of the detection grid corresponds to the wing deflection; and
a transmitter to transmit information on the detected turbulence from the air turbulence detector to an air traffic control location,
wherein the detection grid is configured to be affixed to the aircraft wing and the laser is configured to be affixed to an aircraft fuselage.

2. The system according to claim 1, wherein the air turbulence detector includes an accelerometer.

3. The system according to claim 1, wherein the transmitter is configured to transmit the detected turbulence information via a satellite.

4. The system according to claim 1, further including a turbulence processing module to derive characteristics of the detected turbulence.

5. The system according to claim 4, wherein the turbulence processing module includes one or more criteria to determine whether a turbulence alert should be generated.

6. The system of claim 1 wherein a turbulence processing module is coupled to the laser and the detection grid and is configured to control operation of the air turbulence detector.

7. The system of claim 1 wherein the detection grid is configured to be affixed to the aircraft wing and the laser is configured to be affixed to an aircraft fuselage.

8. The system of claim 1 wherein the detection grid is configured to be affixed to a wing tip of the aircraft wing.

9. The system of claim 1 wherein the laser is configured to illuminate a known location on the detection grid if there is no turbulence.

10. The system of claim 1 wherein the detection grid ranges from −30 to +30 degrees off horizontal,
wherein turbulence is measured as a function of a number of degrees of wingtip travel over time, and
wherein zero degrees corresponds to no turbulence.

11. The system of claim 10 wherein turbulence is measured as a function of a number of degrees of wingtip travel over time and altitude changes.

* * * * *